UNITED STATES PATENT OFFICE 2,312,109

WELDING ELECTRODE

John R. McDonald, Weymouth Heights, and Hubert N. Ruel, South Weymouth, Mass., assignors to Bethlehem Steel Company, a corporation of Pennsylvania No Drawing. Application April 6, 1942, Serial No. 437,846

8 Claims. (Cl. 219—8)

Our invention relates to welding electrodes to be used in arc welding. More particularly, it relates to arc welding electrodes consisting of rods of copper-zinc alloys.

Great difficulty has been encountered in effecting arc welding with alloys containing large amounts of copper and zinc, particularly in the field of manganese bronzes. We have discovered that effective arc welding of these materials may be accomplished when the electrodes are provided with a coating consisting predominantly of carbon, especially when the coating contains small amounts of fluxing agents.

In illustrating our invention we shall refer to the use of welding electrodes consisting of manganese bronzes. Manganese bronze, as well known, consists mostly of copper and zinc with smaller amounts of other metals, of which manganese is one. As an illustration of a manganese bronze, the following example is given:

|  | Per cent |
| --- | --- |
| Copper | 59 |
| Tin | 1 |
| Zinc | 38.7 |
| Manganese | 1 |
| Phosphorus | .3 |

It is to be understood, of course, that manganese bronzes vary considerably in composition, but the analysis just given is illustrative of the type of composition involved, wherein copper is present in more than 50% of the composition with zinc present in lesser amounts but being the other major constituent of the composition, and with relatively small amounts of manganese.

Rods of manganese bronze are prepared of suitable dimensions for use as welding rods. These rods are then coated with our composition. This coating composition should contain carbon over 80% with small amounts of certain fluxing ingredients. Carbon in suitable form and the fluxes are ground to a suitable degree of fineness and mixed in an appropriate vehicle with which the electrodes are then coated. For example, I may prepare the following mixture:

|  | Per cent |
| --- | --- |
| Petroleum coke | 96 |
| Graphite | 0.5 |
| Aluminum | 0.5 |
| Sodium fluoride | 1.0 |
| Precipitated chalk | 1.0 |
| Sodium acid phosphate | 0.5 |
| Kaolin | 0.5 |

This composition is then mixed in a suitable vehicle such as clear brass lacquer, thinned to the desired fluidity, and the welding rods dipped in the coating mixture a sufficient number of times to secure the desired thickness, four or five dips usually being satisfactory when the lacquer has been diluted in the proportions of 75% lacquer and 25% thinner. The adherence of the coating to the electrode may be improved by a shot blasting of the electrode rods.

In the formula just given above, as an example, aluminum is present in small amount. We have found that this is frequently of benefit in the electrode coating but it is not indispensable and we have secured good results without its use.

An electrode, prepared as above, we have found to be very useful for filling defective areas in bronze castings. For instance, in filling a cavity in a propeller blade, the material to be repaired is preheated to a temperature from 200° F. to 400° F., this preheating being more or less localized to the area to be repaired, then, using the electrode, coated as above, the molten electrode material is deposited in the cavity to fill same. In this repair welding the arc is maintained at medium length. The arc should not be too close as this tends to cause the entrapping of gas as well as slag particles in the welded material. If the arc is too long the weld penetration is not as good and the weld itself tends to be somewhat porous.

It is to be understood that our invention is not limited to the use of manganese bronze electrodes but is applicable to copper zinc alloys generally.

While we have given a specific example of the application of our electrode coating it is to be understood that other fluxes than those specified may be employed and in proportions somewhat different from those here given and successful results still be obtained. However, I have found that the formula above recited gives particularly good results. In any case, however, the coating should consist predominantly of carbon, preferably more than 80%.

Having thus described our invention, what we claim as new and desire to secure by Letters Patent is:

1. A welding electrode consisting of a rod comprised predominantly of copper and zinc and having a coating comprised predominantly of carbon.

2. A welding electrode consisting of a rod comprised predominantly of copper and zinc and having a coating comprised mostly of carbon with small amounts of flux.

3. A welding electrode consisting of a rod of manganese bronze having a coating consisting predominantly of carbon.

4. A welding electrode consisting of a rod of manganese bronze having a coating consisting of more than 80% carbon.

5. A welding electrode consisting of a rod comprised of manganese bronze having a coating comprised mostly of carbon with small amounts of flux.

6. A welding electrode consisting of a rod comprised predominantly of copper and zinc, having a coating comprising more than 80% carbon and small amounts of flux.

7. A welding electrode consisting of a rod of manganese bronze having a coating comprised of more than 80% carbon and a small proportion of flux.

8. A welding electrode consisting of a rod of manganese bronze having a coating of more than 80% carbon, aluminum, 0.5%, sodium fluoride, 1.0%, chalk 1.0%, sodium and phosphate, 0.5%, and kaolin, 0.5%.

JOHN R. McDONALD.
HUBERT N. RUEL.